US009850982B2

(12) United States Patent
Mizuhashi et al.

(10) Patent No.: US 9,850,982 B2
(45) Date of Patent: Dec. 26, 2017

(54) DRIVING DEVICE (71) Applicant: NABTESCO CORPORATION, Tokyo (JP)

(72) Inventors: Hiroki Mizuhashi, Tsu (JP); Kazuma Oishi, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 169 days.

(21) Appl. No.: 14/772,601

(22) PCT Filed: Feb. 26, 2014

(86) PCT No.: PCT/JP2014/054750
§ 371 (c)(1),
(2) Date: Sep. 3, 2015

(87) PCT Pub. No.: WO2014/136638
PCT Pub. Date: Sep. 12, 2014

(65) Prior Publication Data
US 2016/0003325 A1 Jan. 7, 2016

(30) Foreign Application Priority Data

Mar. 8, 2013 (JP) ................................. 2013-047081

(51) Int. Cl.
*F16H 1/32* (2006.01)
(52) U.S. Cl.
CPC .......... *F16H 1/32* (2013.01); *F16H 2001/325* (2013.01)
(58) Field of Classification Search
CPC ....................................................... F16H 1/32
See application file for complete search history.

(56) References Cited

U.S. PATENT DOCUMENTS 8,794,883 B2 * 8/2014 Ou ....................... B23Q 1/5406
409/201
2003/0089186 A1 5/2003 Bogelein et al.
(Continued)

FOREIGN PATENT DOCUMENTS

CN 102203457 A 9/2011
CN 102947049 A 2/2013
(Continued)

OTHER PUBLICATIONS

International Preliminary Report on Patentability and the Written Opinion of the International Searching Authority as issued in International Patent Application No. PCT/JP2014/054750, dated Sep. 8, 2015.
(Continued)

*Primary Examiner* — Tisha D Lewis
(74) *Attorney, Agent, or Firm* — Pillsbury Winthrop Shaw Pittman, LLP (57) ABSTRACT A driving device is provided with a first supporting member disposed in one direction along a rotation axis of a rotated member, and a second supporting member disposed in the other direction. The first supporting member is provided with a first case and a first supporting shaft. The first supporting shaft passes through a first through hole of the first case. The second supporting member is provided with a second case and a second supporting shaft. The second supporting shaft passes through a second through hole of the second case. Only one first bearing is disposed between the first case and the first supporting shaft. Only one second bearing is disposed between the second case and the second supporting shaft.

7 Claims, 9 Drawing Sheets (56) References Cited

U.S. PATENT DOCUMENTS

| | | | | |
|---|---|---|---|---|
| 2010/0206599 A1* | 8/2010 | Sugiyama | ............ | B23Q 1/5406 173/213 |
| 2010/0310335 A1* | 12/2010 | Tatsuda | ................ | B23Q 1/5406 409/204 |
| 2013/0205947 A1 | 8/2013 | Takahashi | | |

FOREIGN PATENT DOCUMENTS

| | | |
|---|---|---|
| EP | 2 354 594 A1 | 8/2011 |
| JP | H01-175135 U | 12/1989 |
| JP | 2003-048135 A | 2/2003 |
| JP | 2004-338007 A | 12/2004 |
| JP | 2009-090439 A | 4/2009 |
| JP | 2009-250279 A | 10/2009 |
| JP | 2012-031952 A | 2/2012 |
| WO | WO 20091057526 A1 | 5/2009 |
| WO | WO 2010/052978 A1 | 5/2010 |
| WO | WO 2011/132324 A1 | 10/2011 |

OTHER PUBLICATIONS

Notification of Reason for Rejection as issued in Japanese Patent Application No. 2013-047081, dated Nov. 8, 2016.
International Search Report as issued in International Patent Application No. PCT/JP2014/054750, dated May 13, 2014.
Written Opinion of the International Searching Authority as issued in International Patent Application No. PCT/JP2014/054750, dated May 13, 2014.
Office Action as issued in Chinese Patent Application No. 201480012922.2, dated Mar. 21, 2017.

* cited by examiner

DRIVING DEVICE

CROSS-REFERENCE TO RELATED APPLICATIONS

This application is the U.S. National Stage of PCT/JP2014/054750, filed Feb. 26, 2014, which in turn claims priority to Japanese Patent Application No. JP 2013-047081, filed Mar. 8, 2013. The contents of these applications are incorporated herein by reference in their entireties.

TECHNICAL FIELD

The present specification discloses a technique related to a driving device. In particular, the present specification discloses a technique related to a driving device which rotates a rotated member while doubly supporting the rotated member at its both ends.

BACKGROUND ART

A driving device is known in which rotates a rotated member while doubly supporting the rotated member at its both ends. An example of this type of driving device is disclosed in Japanese Utility Model Application Publication No. H01-175135 (called Patent Document 1 below). The driving device of Patent Document 1 is provided with a first frame extending in one direction along a rotation axis of the rotated member, and a second frame extending in another direction along the rotation axis. A supporting member for rotatably supporting the rotated member is fixed to each of the first frame and the second frame. Each supporting member includes a case, and a shaft supported rotatably by the case. The case is fixed to the frame (the first frame, the second frame), and the shaft is fixed to the rotated member. A pair of bearings is disposed between the case and the shaft.

SUMMARY OF INVENTION

In a case of supporting a shaft rotatably by a case, it is technical common sense to dispose a pair of bearings between the case and the shaft in order to support the shaft stably. Consequently, in Patent Document 1, the pair of bearings is disposed between the case and the shaft in each supporting member. However, in a case where the rotated member is doubly supported at its both ends, an assembly error may occur when fixing the supporting members to the rotated member. When such an assembly error occurs, a force displacing relative positions of the case and the shaft is applied between the case and the shaft. However, since the relative positions of the case and the shaft are fixed when the pair of bearings is disposed between the case and the shaft, an excessive force is exerted on the bearings. Consequently, when the supporting members are to be fixed to both sides of the rotated member, an assembling operation must be performed with high accuracy. The present specification provides a novel driving device which solves the above problem.

The driving device taught in the present specification rotates a rotated member while doubly supporting the rotated member at its both ends. The driving device comprises a fixing member, a first supporting member and a second supporting member. The fixing member comprises a first frame extending in one direction along a rotation axis of a rotated member, and a second frame extending in another direction along the rotation axis of the rotated member. The first supporting member is attached to the first frame. The first supporting member is disposed between the first frame and the rotated member. The first supporting member comprises a first case, a first supporting shaft, and a first bearing. The first case is provided with a first through hole, and is fixed to one of the first frame and the rotated member. The first supporting shaft passes through the first through hole, and is fixed to the other of the first frame and the rotated member. The first bearing is disposed between the first case and the first supporting shaft. The second supporting member is attached to the second frame. The second supporting member is disposed between the second frame and the rotated member. The second supporting member comprises a second case, a second supporting shaft, and a second bearing. The second case is provided with a second through hole, and is fixed to one of the second frame and the rotated member. The second supporting shaft passes through the second through hole, and is fixed to the other of the second frame and the rotated member. The second bearing is disposed between the second case and the second supporting shaft. In this driving device, only one first bearing is disposed between the first case and the first supporting shaft, and only one second bearing is disposed between the second case and the second supporting shaft.

In the case of the aforementioned driving device, the first case may be fixed to the first frame, and the first supporting shaft may be fixed to the rotated member. Alternatively, the first case may be fixed to the rotated member, and the first supporting shaft may be fixed to the first frame. Similarly, the second case may be fixed to the second frame, and the second supporting shaft may be fixed to the rotated member. Alternatively, the second case may be fixed to the rotated member, and the second supporting shaft may be fixed to the second frame.

According to the aforementioned driving device, only the one first bearing is disposed between the first case and the first supporting shaft, and therefore even if an assembly error occurred when fixing the first supporting member to the rotated member, the relative positions of the first supporting shaft and the first case can change, with the first bearing as a fulcrum. Similarly, even if an assembly error occurred when fixing the second supporting member to the rotated member, the relative positions of the second supporting shaft and the second case can change, with the second bearing as a fulcrum. Consequently, it is possible to suppress excessive force being exerted on the bearings (the first bearing and the second bearing). Moreover, when the first supporting member and the second supporting member are attached to the fixed member, a configuration is completed in which both sides of the fixed member are supported by the pair of bearings. Consequently, the rotated member is stably supported by the fixing member of the driving device by the first supporting member and the second supporting member.

DESCRIPTION OF EMBODIMENTS

Below, several technical features of the embodiments taught in the present specification will be noted. Moreover, each of the items noted below solely have technical usefulness.

The first supporting member may comprise a reduction gear structure of the type in which a first external gear rotates eccentrically relative to a first internal gear. An example of this type of reduction gear structure is a reduction gear comprising a crankshaft, an eccentric rotary gear, and a rotation gear. The crankshaft extends along a rotation axis of an output unit of the reduction gear, and may comprise an eccentric body. The eccentric rotary gear engages with the eccentric body, and may rotate eccentrically with the rotation of the crankshaft. The rotation gear meshes with the eccentric rotary gear, and may have a number of teeth different from a number of teeth of the eccentric rotary gear. The rotation gear may be disposed coaxially with the rotation axis of the output unit of the reduction gear.

In a case where the first supporting member comprises the reduction gear structure comprising the first external gear, the first internal gear, and a first crankshaft, the first crankshaft may be supported by the first supporting shaft. The first eccentric body may be provided on the first crankshaft. Further, the first internal gear may be provided at a wall surface of a first through hole of a first case. The first external gear may engage with the first eccentric body, and may mesh with the first internal gear.

A second supporting member, like the first supporting member, may comprise a reduction gear structure of the type in which a second external gear rotates eccentrically relative to a second internal gear. Further, the second supporting member may comprise a reduction gear structure comprising a second external gear, a second internal gear, and a second crankshaft. In this reduction gear structure, also, the second crankshaft may be supported by a second supporting shaft. The second eccentric body may be provided on the second crankshaft. Further, the second internal gear may be provided at a wall surface of a second through hole of a second case. The second external gear may engage with the second eccentric body, and may mesh with the second internal gear.

In a case where both the first supporting member and the second supporting member comprise a reduction gear structure of the type in which the external gear rotates eccentrically relative to the internal gear, each of the first crankshaft and the second crankshaft may comprise two or more eccentric bodies. As an example, a third eccentric body which is symmetrically offset from the first eccentric body with respect to a first rotation axis of the first crankshaft may be provided on a first frame side than the first eccentric body of the first crankshaft. The third external gear may engage with the third eccentric body. Further, a fourth eccentric body which is symmetrically offset from the second eccentric body with respect to a second rotation axis of the second crankshaft may be provided on a second frame side than the second eccentric body of the second crankshaft. The fourth external gear may engage with the fourth eccentric body. When viewed along a rotation axis direction of the rotated member, the first external gear and the second external gear may be offset in the same direction with respect to the rotation axis of the rotated member. Moreover, in a case of this driving device, the first rotation axis and the second rotation axis may be coaxial, and the first eccentric body and the second eccentric body may be eccentric in the same direction with respect to the first rotation axis.

In the case where both the first supporting member and the second supporting member comprise the reduction gear structure of the type in which the external gear rotates eccentrically relative to the internal gear, the first supporting member and the second supporting member may comprise only one external gear. That is, the first external gear may be the only external gear provided to the first supporting member, and the second external gear may be the only external gear provided to the second supporting member. When viewed along the rotation axis direction of the rotated member, the first external gear and the second external gear may be symmetrically offset with respect to the rotation axis of the rotated member. In the case of this driving device, the first rotation axis of the first crankshaft and the second rotation axis of the second crankshaft may be coaxial, and the first eccentric body and the second eccentric body may be symmetrically offset with respect to the first rotation axis.

The first supporting shaft may be fixed to the first frame, the first case and the second case may be fixed to the rotated member, and the second supporting shaft may be fixed to the second frame.

EMBODIMENTS

First Embodiment

Figure 1:
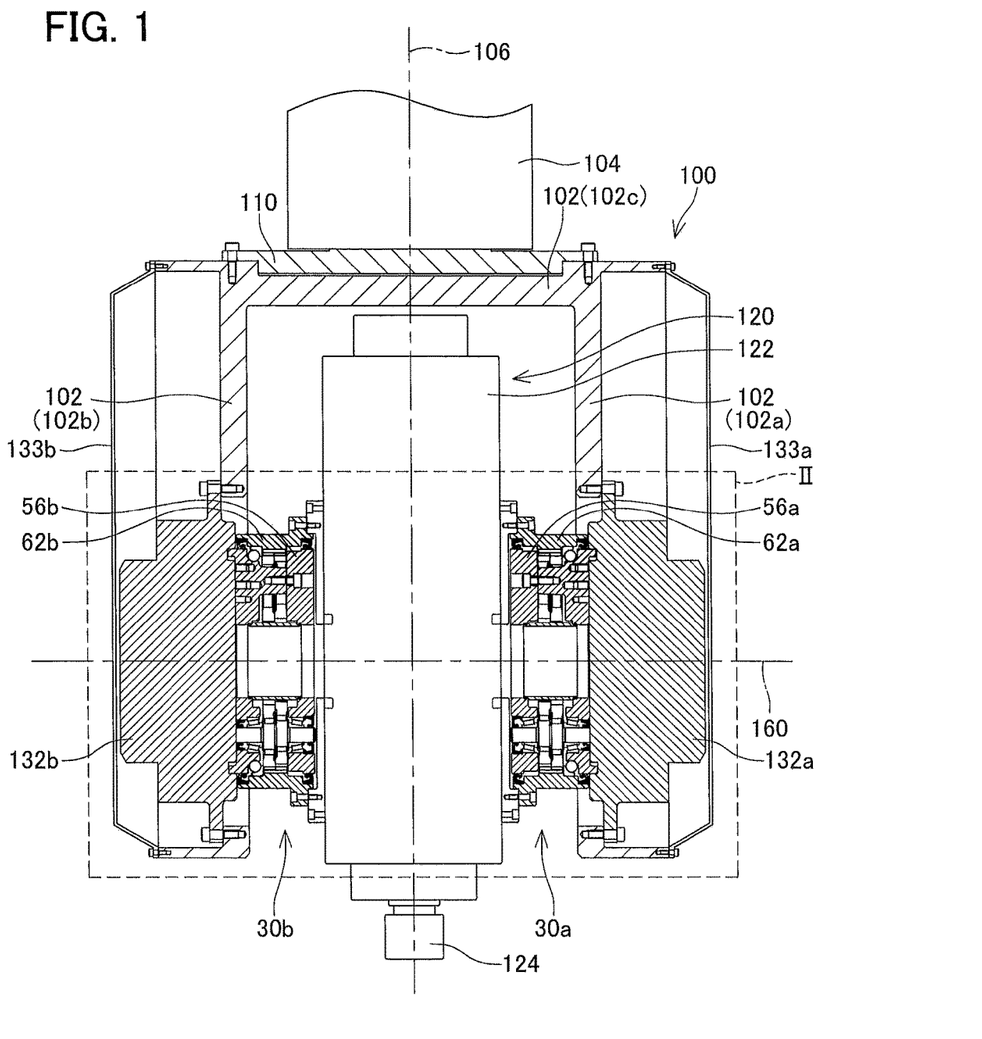
FIG. 1 shows a cross-sectional view of a state in which a fixed member has been attached to a driving device of a first embodiment.

FIG. 1 shows a state in which a machine tool 120 has been attached to a driving device 100. The machine tool 120 is an example of a rotated member. The driving device 100 is fixed to an output member 110 which rotates relative to a base shaft 104. An entirety of the driving device 100 rotates about a rotation axis 106 relative to the base shaft 104. The driving device 100 rotates the machine tool 120 about a rotation axis 160. Moreover, the machine tool 120 comprises a body 122, and a head unit 124 which rotates relative to the body 122. A tool (not shown) is attached to the head unit 124.

The driving device 100 comprises a fixing member 102, a first reduction gear 30*a*, and a second reduction gear 30*b*. The fixing member 102 performs a position fixing of the machine tool 120 in the rotation axis 106 direction. The fixing member 102 comprises a first frame 102*a*, a second frame 102*b*, and a coupling frame 102*c*. The first frame 102*a* extends in one direction along the rotation axis 160 of the machine tool 120. The second frame 102*b* extends in the other direction along the rotation axis 160 of the machine tool 120. That is, the second frame 102*b* extends in the opposite direction to the first frame 102*a* relative to the machine tool 120. The coupling frame 102*c* couples the first frame 102*a* and the second frame 102*b*, and is fixed to the output member 110. The machine tool 120 is disposed between the first frame 102*a* and the second frame 102*b*. The first reduction gear 30*a* is fixed to the first frame 102*a*, and the second reduction gear 30*b* is fixed to the second frame 102*b*. The first reduction gear 30*a* is an example of a first supporting member, and the second reduction gear 30*b* is an example of a second supporting member.

The first reduction gear 30*a* is disposed between the first frame 102*a* and the machine tool 120. The first reduction gear 30*a* comprises a first case 62*a* and a first supporting shaft 56*a*. The first supporting shaft 56*a* is supported rotatably by the first case 62*a*. The first case 62*a* is fixed to the body 122 of the machine tool 120, and the first supporting shaft 56*a* is fixed to the first frame 102*a*. The second reduction gear 30*b* is disposed between the second frame 102*b* and the machine tool 120. The second reduction gear 30*b* comprises a second case 62*b* and a second supporting shaft 56*b*. The second case 62*b* is fixed to the body 122 of the machine tool 120, and the second supporting shaft 56*b* is fixed to the second frame 102*b*. The second supporting shaft 56*b* is supported rotatably by the second case 62*b*. The rotation axis 160 corresponds to a rotation axis of output units (the cases 62*a*, 62*b*) of the first reduction gear 30*a* and the second reduction gear 30*b*. Consequently, the machine tool 120 rotates about the rotation axis 160 with respect to the fixing member 102.

A first motor case 132*a* is fixed to the first frame 102*a*. A motor (not shown) for driving the first reduction gear 30*a* is housed within the first motor case 132*a*. A first cover 133*a* is fixed to the first frame 102*a*. The first cover 133*a* prevents the first motor case 132*a* from being exposed to the exterior of the driving device 100. A second motor case 132*b* is fixed to the second frame 102*b*. A motor for driving the second reduction gear 30*b* is housed within the second motor case 132*b*. A second cover 133*b* is fixed to the second frame 102*b*. The second cover 133*b* prevents the second motor case 132*b* from being exposed to the exterior of the driving device 100.

Figure 2:
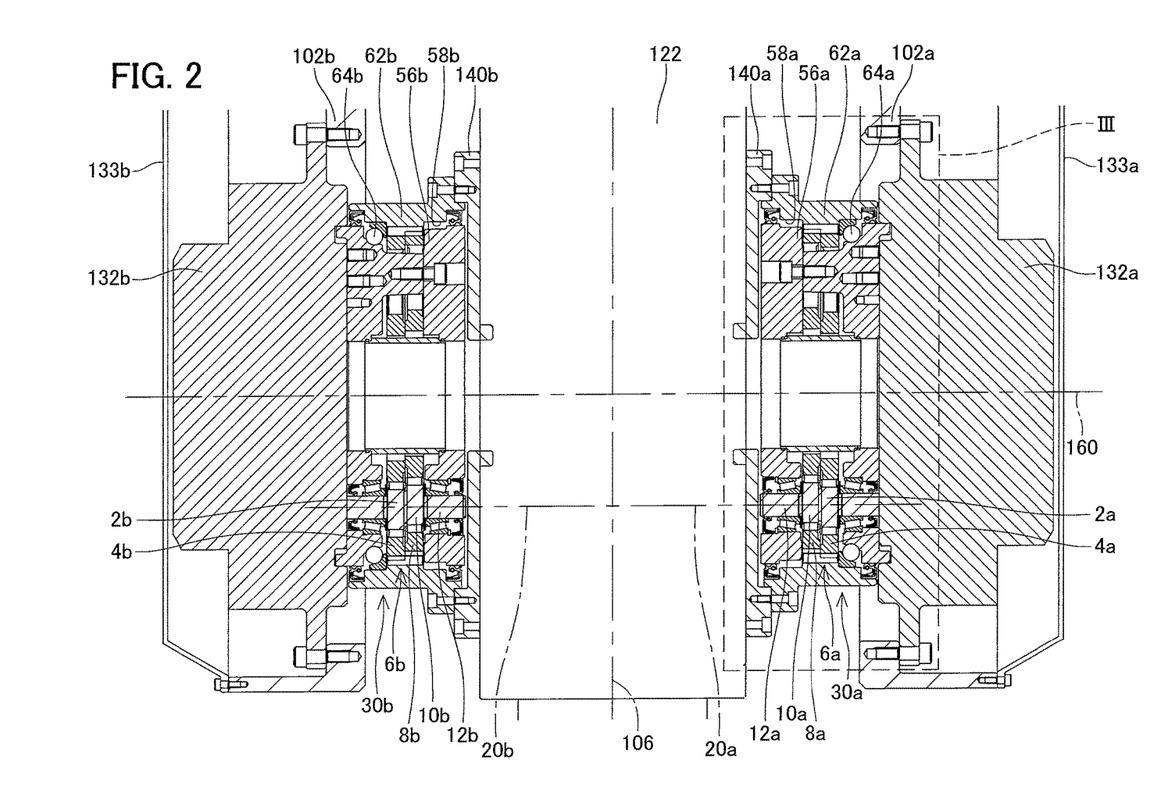
FIG. 2 shows an enlarged cross-sectional view of a portion surrounded by a broken line II of FIG. 1.

The driving device 100 will be described in detail with reference to FIG. 2. Moreover, the first reduction gear 30*a* and the second reduction gear 30*b* comprise substantially identical configurations. Below, the first reduction gear 30*a* will be described in detail. Components of the second reduction gear 30*b* will be denoted by same reference numbers as in the first reduction gear 30*a*, or by reference numbers having the same lower two digits, and a description thereof may be omitted.

The first case 62*a* is fixed to the body 122 of the machine tool 120 via a first connecting member 140*a*. The first case 62*a* comprises a first through hole 58*a*. The first supporting shaft 56*a* passes through the first through hole 58*a*. The first supporting shaft 56*a* is fixed to the first frame 102*a* (the fixing member 102) via the first motor case 132*a*. A first bearing 64*a* is disposed between the first case 62*a* and the first supporting shaft 56*a*. The first bearing 64*a* is an angular contact ball bearing.

The first reduction gear 30*a* comprises a first internal gear 6*a*, the first supporting shaft 56*a*, a first crankshaft 12*a*, and two external gears (first external gear 8*a*, third external gear 4*a*). The first internal gear 6*a* is provided at a wall surface of the first through hole 58*a* of the first case 62*a*. The rotation axis 160 corresponds to rotation axes of the first internal gear 6*a* and the first supporting shaft 56*a*. The first crankshaft 12*a* is supported by the first supporting shaft 56*a*. A rotation axis 20*a* is a rotation axis of the first crankshaft 12*a* (may be called first rotation axis 20*a* below). The first rotation axis 20*a* is parallel to the rotation axis 160. That is, the first crankshaft 12*a* extends parallel to the rotation axis 160 at a position offset from the rotation axis 160. Moreover, the first reduction gear 30*a* comprises three first crankshafts 12*a*. Each of the first crankshafts 12*a* is disposed to be equally spaced from each other around the rotation axis 160.

Each first crankshaft 12*a* comprises two eccentric bodies (first eccentric body 10*a*, third eccentric body 2*a*). In a first rotation axis 20*a* direction, the first eccentric body 10*a* is disposed on the machine tool 120 side than the third eccentric body 2*a*. The first eccentric body 10*a* and the third eccentric body 2*a* are eccentric symmetrically with respect to the first rotation axis 20*a*. The first external gear 8*a* engages with the first eccentric body 10*a*, and the third external gear 4*a* engages with the third eccentric body 2*a*. In the rotation axis 160 direction, the first external gear 8*a* is disposed on the machine tool 120 side than the third external gear 4*a*. A number of teeth of the first external gear 8*a* and that of the third external gear 4*a* is identical. In the rotation axis 160 direction, the first bearing 64*a* is disposed on the first motor case 132*a* side (the first frame 102*a* side) than the first external gear 8*a* and the third external gear 4*a*. Only one first bearing 64*a* is disposed between the first case 62*a* and the first supporting shaft 56*a*.

The second case 62*b* is fixed to the body 122 of the machine tool 120 via a second connecting member 140*b*. The second case 62*b* comprises a second through hole 58*b*. The second supporting shaft 56*b* passes through the second through hole 58*b*. The second supporting shaft 56*b* is fixed to the second frame 102*b* via the second motor case 132*b*. A second bearing 64*b* is disposed between the second case 62*b* and the second supporting shaft 56*b*. The second bearing 64*b* is an angular contact ball bearing.

The second reduction gear 30*b* comprises a second internal gear 6*b*, the second supporting shaft 56*b*, second crankshafts 12*b* and two external gears (second external gear 8*b*, fourth external gear 4*b*). The rotation axis 160 also corresponds to rotation axes of the second internal gear 6*b* and the second supporting shaft 56*b*. A rotation axis 20*b* is a rotation axis of each second crankshaft 12*b* (may be called second rotation axis 20*b* below). The second rotation axis 20*b* is coaxial with the first rotation axis 20*a*. That is, each second crankshaft 12*b* is coaxial with the first crankshaft 12*a*. Each second crankshaft 12*b* also extends parallel to the rotation axis 160.

Each second crankshaft 12*b* comprises two eccentric bodies (second eccentric body 10*b*, fourth eccentric body 2*b*). In the second rotation axis 20*b* direction, the second eccentric body 10*b* is disposed on the machine tool 120 side than the fourth eccentric body 2*b*. The second eccentric body 10*b* and the fourth eccentric body 2*b* are offset symmetrically with respect to the second rotation axis 20*b*. The second external gear 8*b* engages with the second eccentric body 10*b*, and the fourth external gear 4*b* engages with the fourth eccentric body 2*b*. In the rotation axis 160 direction, the second external gear 8*b* is disposed on the machine tool 120 side than the fourth external gear 4*b*. In the rotation axis 160 direction, the second bearing 64*b* is disposed on the second motor case 132*a* side (the second frame 102*b* side) than the second external gear 8*b* and the fourth external gear 4*b*. Only one second bearing 64*b* is disposed between the second case 62*b* and the second supporting shaft 56*b*.

Figure 3:
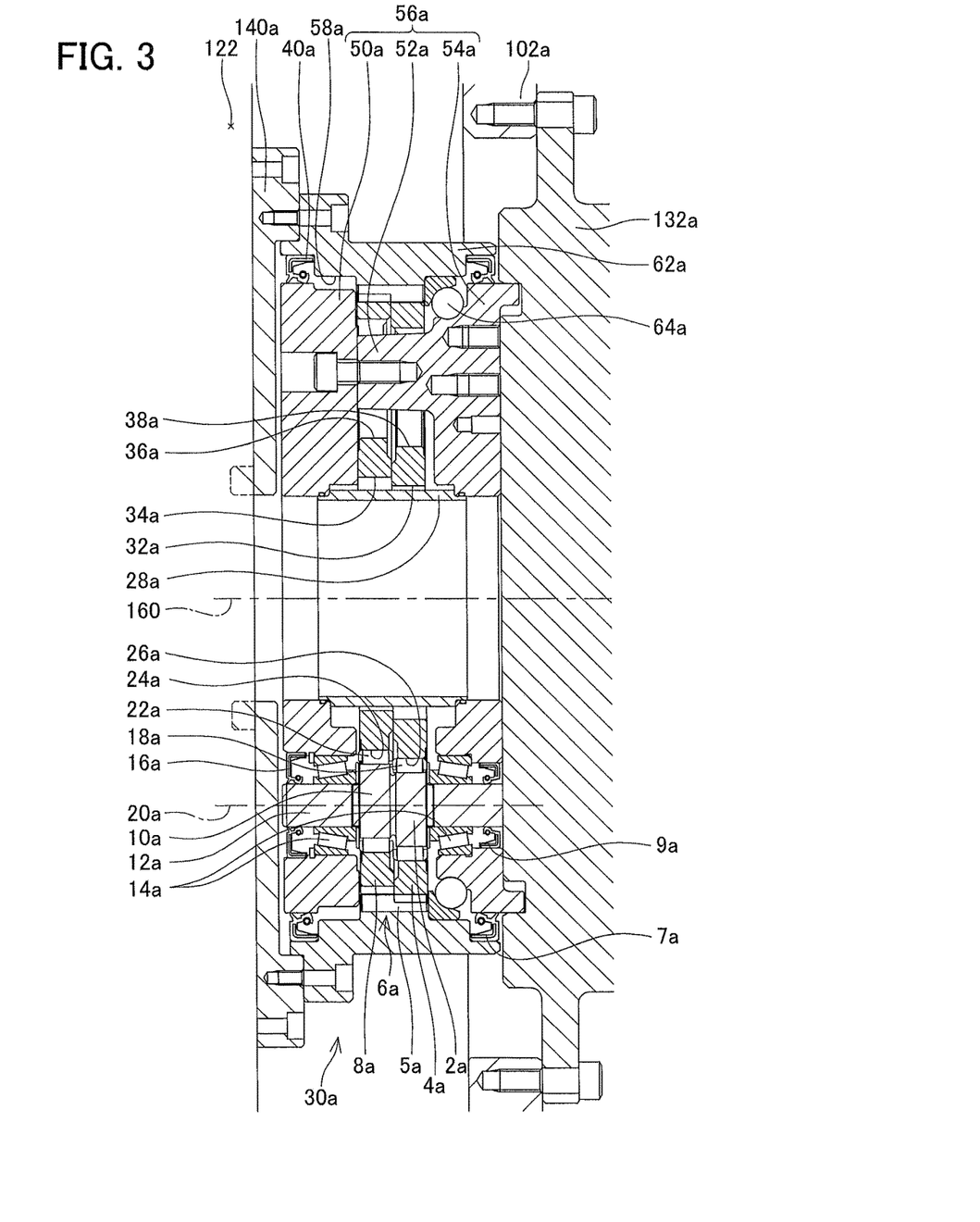
FIG. 3 shows an enlarged cross-sectional view of a portion surrounded by a broken line III of FIG. 2.

The configuration of the first reduction gear 30*a* will be described in more detail with reference to FIG. 3. As described above, the first reduction gear 30*a* and the second reduction gear 30*b* comprise substantially identical configurations. Consequently, only the configuration of the first reduction gear 30*a* will be described, and a description of the configuration of the second reduction gear 30*b* will be omitted.

The first internal gear 6*a* is structured by aligning inner teeth pins 5*a* along a circumferential direction on a wall surface of the first through hole 58*a*. In the rotation axis 160 direction, the first internal gear 6*a* is provided at a center of the first case 62*a*. The first supporting shaft 56*a* comprises a first plate 50a and a second plate 54a. The second plate 54a comprises a columnar portion 52a. The columnar portion 52a extends toward the first plate 50a from the second plate 54a. The columnar portion 52a is fixed to the first plate 50a. In the rotation axis 160 direction, the first plate 50a is positioned at the machine tool 120 side, and the second plate 54a is positioned at the motor case 132a side (the first frame 102a side). The first bearing 64a is disposed between the second plate 54a and the first case 62a. A bearing is not disposed between the first plate 50a and the first case 62a. That is, the first supporting shaft 56a is supported by the first case 62a via the one first bearing 64a at a position away from the machine tool 120.

Each first crankshaft 12a is supported by the first supporting shaft 56a via a pair of bearings 14a. The pair of bearings 14a is tapered roller bearings. Movement of the first crankshaft 12a in an axial direction and in a radial direction with respect to the first supporting shaft 56a is regulated by the pair of bearings 14a. The first eccentric body 10a is positioned at the machine tool 120 side, and the third eccentric body 2a is positioned at the motor case 132a side (the first frame 102a side).

A first center through hole 34a, a first supporting shaft through hole 36a, and a first crankshaft through hole 24a are provided in the first external gear 8a. A third center through hole 32a, a third supporting shaft through hole 38a, and a third crankshaft through hole 26a are provided in the third external gear 4a. A cylindrical member 28a passes through the first center through hole 34a and the third center through hole 32a. The cylindrical member 28a is fixed to the first plate 50a and the second plate 54a. The columnar portion 52a passes through the first supporting shaft through hole 36a and the third supporting shaft through hole 38a. A clearance is provided between the columnar portion 52a and the first supporting shaft through hole 36a, and between the columnar portion 52a and the third supporting shaft through hole 38a. The first eccentric body 10a engages with the first crankshaft through hole 24a via a cylindrical roller bearing 22a. The third eccentric body 2a engages with the third crankshaft through hole 26a via a cylindrical roller bearing 18a.

An oil seal 40a is disposed between the first case 62a and the first plate 50a, an oil seal 7a is disposed between the first case 62a and the second plate 54a, an oil seal 16a is disposed between the first plate 52a and the first crankshaft 12a, and an oil seal 9a is disposed between the second plate 54a and the first crankshaft 12a. Lubricant (oil) within the first reduction gear 30a is prevented from leaking to the exterior of the first reduction gear 30a by the oil seals 40a, 7a, 16a and 9a.

A motor (not shown) for driving the first reduction gear 30a is housed within the first motor case 132a. Torque of the motor is transmitted to the first crankshafts 12a. When the first crankshafts 12a rotate, the first eccentric body 10a and the third eccentric body 2a rotate eccentrically around the first rotation axis 20a. The first external gear 8a and the third external gear 4a rotate eccentrically with the eccentric rotation of the eccentric bodies 10a, 2a while meshing with the first internal gear 6a. An offset directions of the first external gear 8a and the third external gear 4a are symmetrical relative to the rotation axis 160.

A number of teeth of the first internal gear 6a and the numbers of teeth of the external gears 8a, 4a are different. Consequently, when the external gears 8a, 4a rotate eccentrically, the external gears 8a, 4a rotate relative to the first internal gear 6a. The external gears 8a, 4a can also be called eccentric rotary gears of the first reduction gear 30a. The first internal gear 6a can also be called a rotation gear of the first reduction gear 30a. The external gears 8a, 4a are supported by the first supporting shaft 56a via the first crankshaft 12a. Therefore, when the external gears 8a, 4a rotate eccentrically, the first supporting shaft 56a rotates relative to the first internal gear 6a. The first internal gear 6a (the first case 62a) is fixed to the body 122 of the machine tool 120 via the connecting member 140a. Further, the first supporting shaft 56a is fixed to the fixing member 102 (the first frame 102a) via the first motor case 132a. Consequently, when the external gears 8a, 4a rotate eccentrically, the machine tool 120 rotates around the rotation axis 160 with respect to the fixing member 102. The driving of the first reduction gear 30a and the driving of the second reduction gear 30b are performed simultaneously. Consequently, the second reduction gear 30b also performs the same movement as the first reduction gear 30a. Moreover, the external gears 8b, 4b can also be called eccentric rotary gears of the second reduction gear 30b. The second internal gear 6b can also be called a rotation gear of the second reduction gear 30b. The driving device 100 supports the machine tool 120 at both ends, and can tilt the position of a tool (not shown) attached to the head unit 124.

The characteristics of the driving device 100 will be described. As described above, the first case 62a and the second case 62b are fixed to the machine tool 120. Further, the first supporting shaft 56a and the second supporting shaft 56b are fixed to the fixing member 102. When the machine tool 120 is attached to the driving device 100, the first case 62a, the second case 62b and the machine tool 120 are integrated, and the first supporting shaft 56a, the second supporting shaft 56b and the fixing member 102 are integrated. The integrated body, which is the first case 62a, the second case 62b and the machine tool 120, is supported by the pair of bearings (the first bearing 64a and the second bearing 64b) with respect to the integrated body which is the first supporting shaft 56a, the second supporting shaft 56b and the fixing member 102. The machine tool 120 can be supported at both ends with respect to the fixing member 102. Consequently, it is possible to control the position of the machine tool 120 around the rotation axis 160 with high precision.

Moreover, in a conventional driving device, a pair of bearings is disposed between the case and the shaft for each reduction gear. Since the shaft is doubly supported at both ends by the case, the relative position of the shaft and the case in each reduction gear is stable. However, in the case where one rotated member (e.g., the machine tool) is doubly supported at its both ends by two reduction gears, a force which causes a relative positional shift to occur between the shaft and the case is applied when an assembly error occurs upon attaching the reduction gears to the rotated member. As a result, a force may be applied to the pair of bearings disposed between the shaft and the case, and a life of the bearings may be reduced. In order to avoid this type of inconvenience, in the conventional driving device, the two reduction gears had been required to be attached to the rotated member with high precision.

In the driving device taught in the present specification, only one bearing is disposed between the shaft and the case in each of the reduction gears. Consequently, even if the assembly error occurs upon attaching the two reduction gears to the machine tool, the positions of the shaft and the case can shift relatively. As a result, it is possible to suppress the excessive force being applied to the bearing. That is, in the technique disclosed in the present specification, the shaft is intentionally not supported firmly by the case in each of the reduction gears. Thereby, it is possible to realize a highly durable driving device (having a long life).

Other characteristics of the driving device 100 will be described. As described above, the first rotation axis 20a of each first crankshaft 12a, and the second rotation axis 20b of each second crankshaft 12b are coaxial. When viewed along one direction of the first rotation axis 20a, offset directions of the first eccentric body 10a and the second eccentric body 10b are the same. Consequently, the movement of the eccentric rotation of the first external gear 8a, and the movement of the eccentric rotation of the second external gear 8b is equal at both sides of the machine tool 120. As a result, when driving the driving device 100, the direction of force applied to the first internal gear 6a from the first external gear 8a is equal to the direction of force applied to the second internal gear 6b from the second external gear 8b. It is possible to suppress vibration of the machine tool 120. Moreover, when viewed along the one direction of the first rotation axis 20a, offset directions of the third eccentric body 2a and the fourth eccentric body 2b are the same. The movement of the eccentric rotation of the third external gear 4a, and the movement of the eccentric rotation of the fourth external gear 4b are equal at both sides of the machine tool 120.

Further, as described above, in the first reduction gear 30a, the offset direction of the first eccentric body 10a with respect to the first rotation axis 20a is symmetrical to the offset direction of the third eccentric body 2a. Consequently, when driving the first reduction gear 30a, the positions of the first external gear 8a and the third external gear 4a are always symmetrical with respect to the rotation axis 160. Consequently, it is possible to improve the rotational balance of the first crankshafts 12a. This characteristic can also be obtained in the second reduction gear 30b.

Moreover, in the present embodiment, a structure was described in which the first rotation axis 20a and the second rotation axis 20b are coaxial, and the first eccentric body 10a and the second eccentric body 10b are eccentric in the same direction with respect to the rotation axes 20a, 20b. However, in a structure in which the movement of the eccentric rotation of the first external gear 8a and the movement of the eccentric rotation of the second external gear 8b is equal at both sides of the machine tool 120, the first rotation axis 20a and the second rotation axis 20b may not be coaxial. That is, the first external gear 8a of the first reduction gear 30a and the second external gear 8b of the second reduction gear 30b may be offset in the same direction with respect to the rotation axis 160. For example, a structure is possible in which the first crankshafts 12a and the second crankshafts 12b are disposed symmetrically with respect to the rotation axis 160 and, when viewed along one direction of the first rotation axis 20a (or the second rotation axis 20b), the offset direction of the first eccentric body 10a and the offset direction of the second eccentric body 10b are the same.

Further, in the present embodiment, an example was described using reduction gears as the first supporting member and the second supporting member. However, a supporting member not having a reduction gear structure may be used instead of the first reduction gear 30a and/or the second reduction gear 30b of the present embodiment. In this case, also, only one bearing is disposed between the case and the shaft. In the case of using a supporting member not having a reduction gear structure, the machine tool 120 can be caused to rotate about the rotation axis 160 by attaching a motor to the case or the shaft. Further, a reduction gear in which an internal gear rotates eccentrically can be used as the first supporting member and/or the second supporting member. The important thing is that each of the two supporting members (first supporting member and second supporting member) disposed at both sides of the machine tool 120 is provided with a case and a shaft, and that only one bearing is disposed between the case and the shaft. The same applies in the following embodiments.

Second Embodiment

A driving device 200 will be described. The driving device 200 is a modification of the driving device 100. Specifically, in the driving device 200, only the configuration of the supporting member (reduction gear) is different from that of the driving device 100. Consequently, members which are the same as the members of driving device 100 will be denoted by the same reference numbers as in the driving device 100 or by reference numbers having the same lower two digits, and a description thereof may thereby be omitted. Further, the configuration of a first reduction gear 230a is described, and a description of the configuration of a second reduction gear 230b may be omitted.

Figure 4:
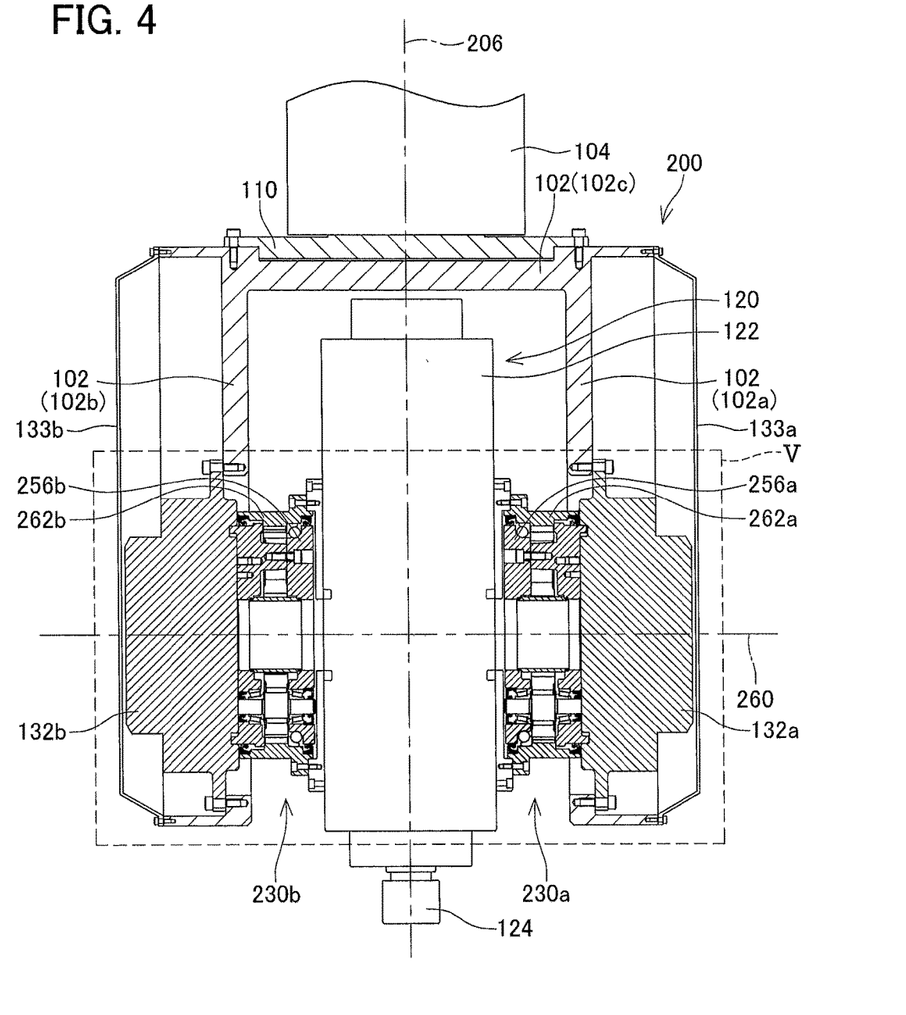
FIG. 4 shows a cross-sectional view of a state in which a fixed member has been attached to a driving device of a second embodiment.
Figure 5:
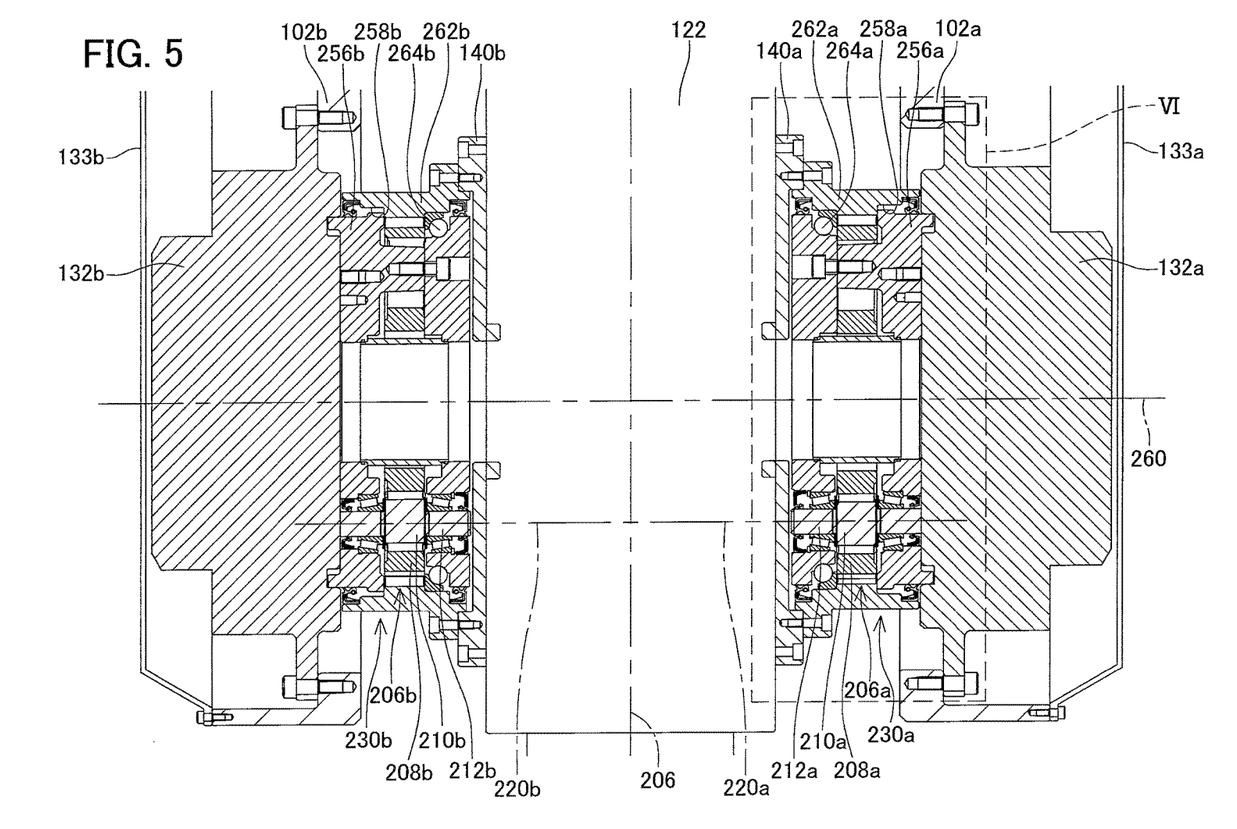
FIG. 5 shows an enlarged cross-sectional view of a portion surrounded by a broken line V of FIG. 4.
Figure 6:
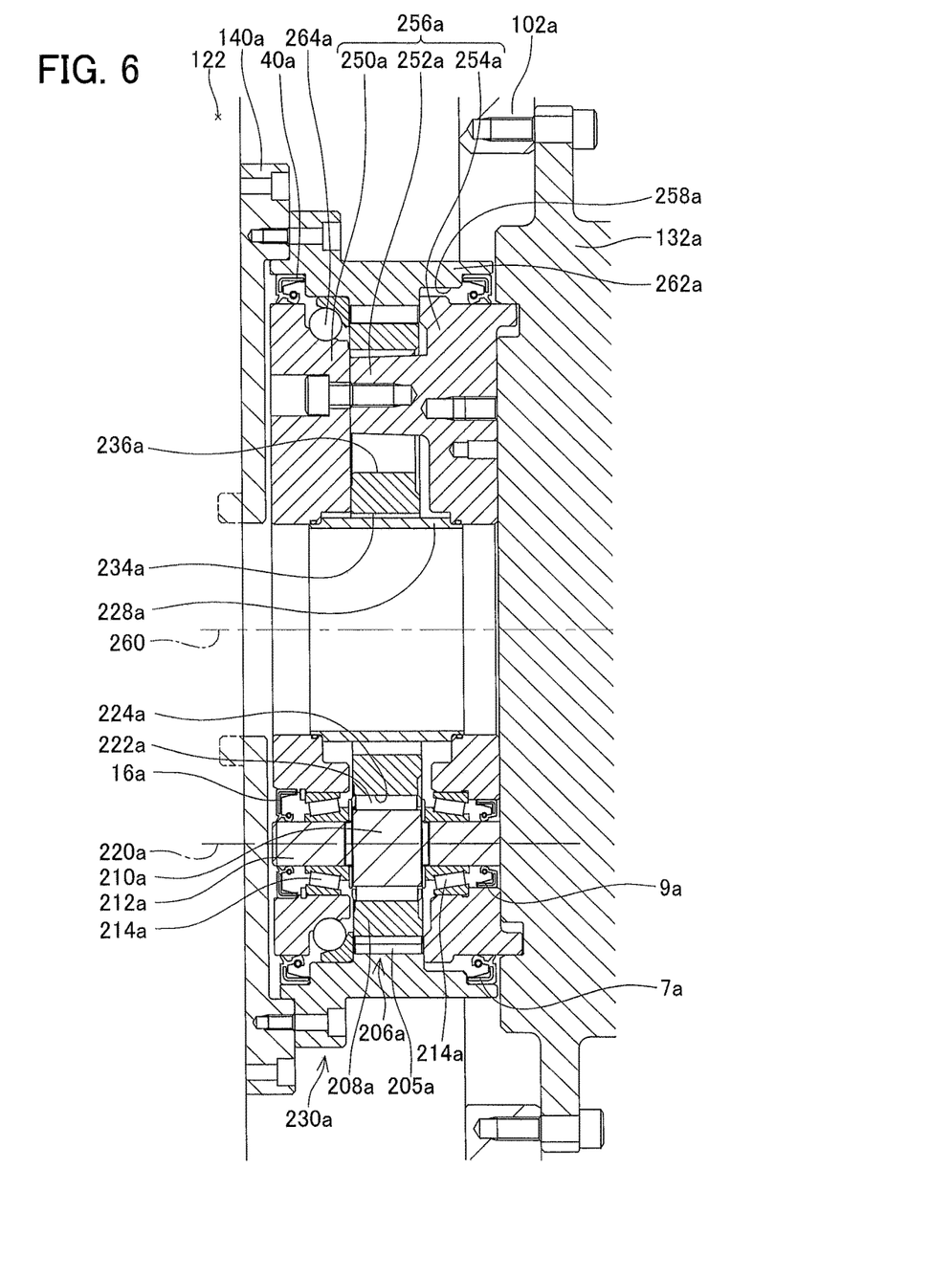
FIG. 6 shows an enlarged cross-sectional view of a portion surrounded by a broken line VI of FIG. 5.

As shown in FIG. 4 to FIG. 6, only one first eccentric body 210a is provided on a first crankshaft 212a of the first reduction gear 230a. Similarly, only one second eccentric body 210b is provided on a second crankshaft 212b of the second reduction gear 230b. A first rotation axis 220a of the first crankshaft 212a and a second rotation axis 220b of the second crankshaft 212b are coaxial. Viewed along one direction along the first rotation axis 220a, an offset direction of the first eccentric body 210a, and an offset direction of the second eccentric body 210b are symmetrical with respect to the first rotation axis 220a. That is, a center of the first eccentric body 210a and a center of the second eccentric body 210b are symmetrical with respect to the first rotation axis 220a. A first external gear 208a is engaged with the first eccentric body 210a, and a second external gear 208b is engaged with the second eccentric body 210b. Consequently, when viewed along one direction of a rotation axis 260, the first external gear 208a and the second external gear 208b are eccentric in opposite directions (are symmetrical with respect to the rotation axis 260).

As shown in FIG. 5 and FIG. 6, in the first reduction gear 230a, a first bearing 264a is disposed between a first plate 250a and a first case 262a. A bearing is not disposed between a second plate 254a and the first case 262a. A first supporting shaft 256a is supported by the first case 262a via the one first bearing 264a on the machine tool 120 side than the first external gear 208a. In other words, in the rotation axis 260 direction, the first bearing 264a is disposed on the machine tool 120 side than the first external gear 208a.

Similarly, in the second reduction gear 230b, a second supporting shaft 256b is supported by a second case 262b via one second bearing 264b on the machine tool 120 side than the second external gear 208b. That is, in the rotation axis 260 direction, the second bearing 264b is disposed on the machine tool 120 side than the second external gear 208b.

The characteristics of the driving device 200 will be described. As described above, in the driving device 200, each of the first reduction gear 230a and the second reduction gear 230b is provided with only one external gear (the first external gear 208a, the second external gear 208b). Consequently, compared with a reduction gear (e.g., the reduction gears 30a, 30b of embodiment 1) provided with a plurality of external gears, it is possible to reduce the length in the axial direction of the reduction gears. That is, according to the technique disclosed in the present embodiment, it is possible to realize a compact driving device.

Further, the first external gear 208a and the second external gear 208b are eccentric symmetrically with respect to the rotation axis 260. Consequently, the force is balanced which is applied from the two external gears (the first external gear 208a, the second external gear 208b) to the integrated body, in which the first case 262a, the machine tool 120, and the second case 262b are combined.

The first reduction gear 230a and the second reduction gear 230b can also be considered as being a reduction gear provided with two external gears, of which part is divided and disposed at both sides of the machine tool 120. For example, in the case of the driving device 100 of the first embodiment, the first reduction gear 30a comprises the two external gears 8a, 4a which are eccentric symmetrically with respect to the rotation axis 160. The driving device 200 of the present embodiment can be considered as a structure in which the two external gears 8a, 4a of the driving device 100 of the first embodiment are divided, and one of the external gears has been disposed on the opposite side of the machine tool 120.

In the driving device 200, the first bearing 264a and the second bearing 264b are each disposed further to the machine tool 120 side than the first external gear 208a and the second external gear 208b. That is, the first external gear 208a and the second external gear 208b are disposed outside a range where the pair of bearings (the first bearing 264a, the second bearing 264b) support the integrated body which is the cases 262a, 262b and the machine tool 120. Consequently, the machine tool 120 can suppress vibration caused by force being applied to the cases 262a, 262b from the external gears 208a, 208b.

Moreover, in the present embodiment, a structure was described in which the first rotation axis 220a and the second rotation axis 220b are coaxial, and the first eccentric body 210a and the second eccentric body 210b are eccentric symmetrically with respect to the first rotation axis 220a. However, the important thing is that the first external gear 208a and the second external gear 208b rotate eccentrically in a state of being eccentric in opposite directions relative to the rotation axis 260. With this type of structure, the first eccentric body 210a and the second eccentric body 210b need not be symmetrically eccentric with respect to the first rotation axis 220a (the second rotation axis 220b). For example, the structure may be such that the first crankshaft 212a and the second crankshaft 212b are disposed symmetrically with respect to the rotation axis 260, and the offset direction of the first eccentric body 210a and the offset direction of the second eccentric body 210b are opposite when viewed along one direction of the first rotation axis 220a (or the second rotation axis 220b).

Third Embodiment

A driving device 300 will be described. The driving device 300 is a modification of the driving device 200. Specifically, the driving device 300 differs from the driving device 200 only in the structure of reduction gears 330a and 330b. Consequently, members the same as those of the driving device 200 will be denoted by the same reference numbers as those of the driving device 200 or by reference numbers having the same lower two digits, and a description thereof is thereby omitted. Further, the configuration of the first reduction gear 330a is described, and a description of the configuration of the second reduction gear 330b may be omitted.

Figure 7:
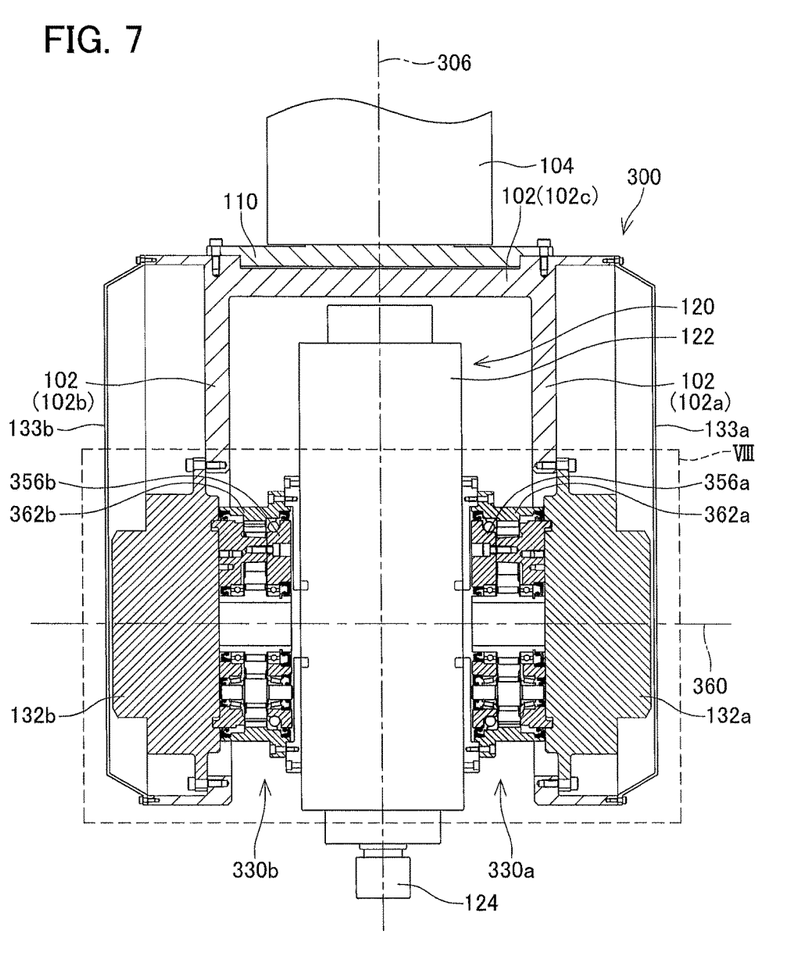
FIG. 7 shows a cross-sectional view of a state in which a fixed member has been attached to a driving device of a third embodiment.
Figure 8:
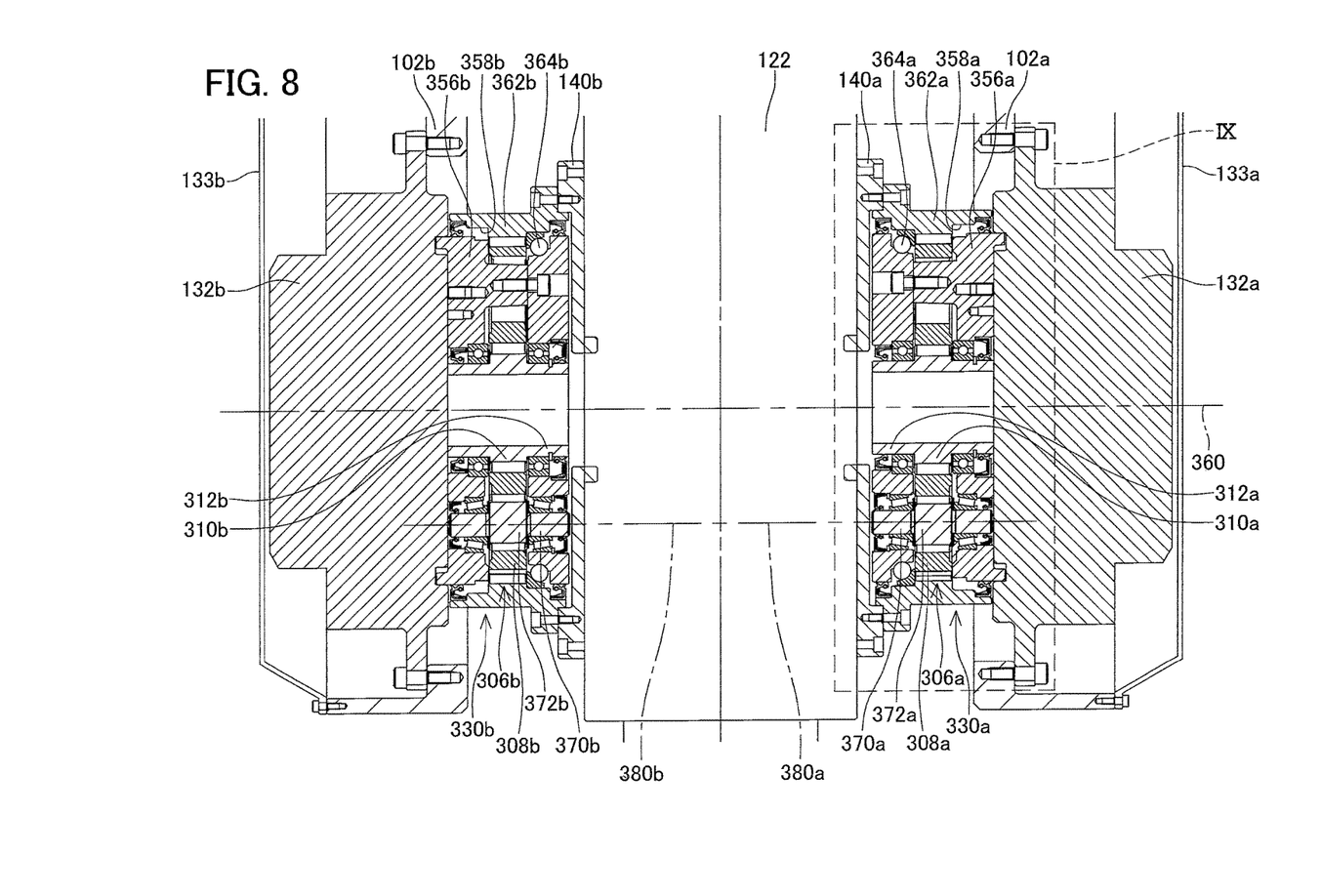
FIG. 8 shows an enlarged cross-sectional view of a portion surrounded by a broken line VIII of FIG. 7.
Figure 9:
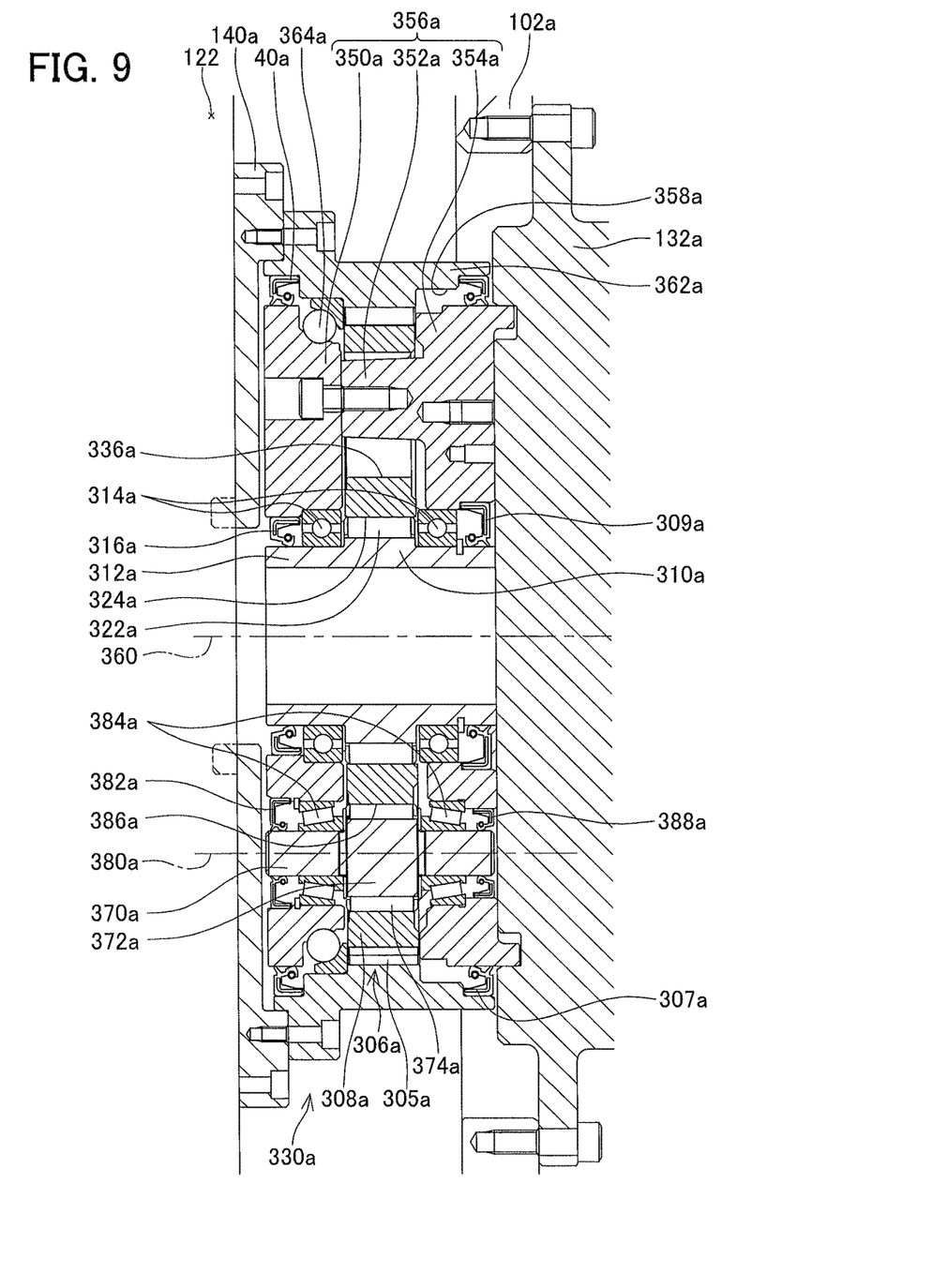
FIG. 9 shows an enlarged cross-sectional view of a portion surrounded by a broken line IX of FIG. 8.

As shown in FIG. 7 to FIG. 9, in the driving device 300, a first crankshaft 312a and a second crankshaft 312b are disposed coaxially with a rotation axis 360. That is, the crankshafts 312a, 312b are disposed on the rotation axis 360 that is an output unit of the first reduction gear 330a and the second reduction gear 330b. The first crankshaft 312a is provided with only one first eccentric body 310a, and the second crankshaft 312b is provided with only one second eccentric body 310b. Offset directions of the first eccentric body 310a and of the second eccentric body 310b are symmetrical with respect to the rotation axis 360.

As shown in FIG. 8, the first reduction gear 330a comprises first driven crankshafts 370a. The first reduction gear 330a comprises three first driven crankshafts 370a. The first driven crankshafts 370a are each disposed equally spaced from each other around the rotation axis 360. Each of the first driven crankshafts 370a is provided with only one first driven eccentric body 372a. The second reduction gear 330b comprises second driven crankshafts 370b. The second reduction gear 330b comprises three second driven crankshafts 370b. The second driven crankshafts 370b are each disposed equally spaced from each other around the rotation axis 360. A rotation axis 380a of each first driven crankshaft 370a and a rotation axis 380b of each second driven crankshaft 370b are coaxial. Each of the second driven crankshafts 370b is provided with only one second driven eccentric body 372b. When viewed along one direction of the rotation axis 380a, an offset direction of the first driven eccentric body 372a and an offset direction of the second driven eccentric body 372b are opposite with respect to the rotation axis 380a.

Torque of a motor (not shown) is not transmitted directly to the first driven crankshafts 370a and the second driven crankshafts 370b. The first driven crankshafts 370a and the second driven crankshafts 370b rotate with the eccentric rotation of external gears 308a, 308b. Since each of the first reduction gear 330a and the second reduction gear 330b comprises the first driven crankshafts 370a and the second driven crankshafts 370b, the first external gear 308a and the second external gear 308b rotate smoothly.

As shown in FIG. 9, the first crankshaft 312a is supported by a first supporting shaft 356a via a pair of bearings 314a. The pair of bearings 314a is deep groove ball bearings. Each first driven crankshaft 370a is supported by the first supporting shaft 356a via a pair of bearings 384a. The pair of bearings 384a is tapered roller bearings. Movement of the first driven crankshafts 370a in the axial direction and radial direction is regulated by the tapered roller bearings 384a.

The first external gear 308a comprises a crankshaft through hole 324a, driven crankshaft through holes 386a, and supporting shaft through holes 336a. The crankshaft through hole 324a is provided in a center of the first external gear 308a. The driven crankshaft through holes 386a and the supporting shaft through holes 336a are provided alternately in the circumferential direction of the first external gear 308a. The first eccentric body 310a engages with the crankshaft through hole 324a via a cylindrical roller bearing 322a. The first driven eccentric body 372a engages with the driven crankshaft through holes 386a via cylindrical roller bearings 374a. A columnar portion 352a of the first supporting shaft 356a passes through the supporting shaft through hole 336a. An oil seal 382a is disposed between the first driven crankshaft 370a and a first plate 350a, and an oil seal 388a is disposed between the first driven crankshaft 370a and a second plate 354a.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A driving device comprising:
   a fixing member comprising a first frame extending in one direction along a rotation axis of a rotated member, and a second frame extending in another direction along the rotation axis of the rotated member;
   a first supporting member attached to the first frame, and disposed between the first frame and the rotated member;
   a second supporting member attached to the second frame, and disposed between the second frame and the rotated member,
   wherein the first supporting member comprises:
      a first case provided with a first through hole, and fixed to one of the first frame and the rotated member;
      a first supporting shaft passing through the first through hole, and fixed to the other of the first frame and the rotated member;
      a first crankshaft supported by the first supporting shaft, and provided with a first eccentric body; and
      a first bearing disposed between the first case and the first supporting shaft,
   wherein the second supporting member comprises:
      a second case provided with a second through hole, and fixed to one of the second frame and the rotated member;
      a second supporting shaft passing through the second through hole, and fixed to the other of the second frame and the rotated member; and
      a second bearing disposed between the second case and the second supporting shaft,
   wherein the first bearing is the only bearing disposed between the first case and the first supporting shaft, and
   wherein the second bearing is the only bearing disposed between the second case and the second supporting shaft,
   wherein the first supporting member comprises a first reduction gear structure, the first reduction gear structure comprising a first external gear and a first internal gear and the first reduction gear structure being configured such that the first external gear rotates eccentrically relative to the first internal gear,
   wherein the first internal gear is provided at a wall surface of the first through hole, and
   wherein the first external gear engages with the first eccentric body, and meshes with the first internal gear.

2. The driving device according to claim 1, wherein the second supporting member comprises a second reduction gear structure, the second reduction gear structure comprising a second external gear and a second internal gear and the second reduction gear structure being configured such that the second external gear rotates eccentrically relative to the second internal gear.

3. The driving device according to claim 1, wherein the second supporting member comprises a second reduction gear structure, the second reduction gear structure comprising a second external gear and a second internal gear and the second reduction gear structure being configured such that the second external gear rotates eccentrically relative to the second internal gear, wherein the driving device further comprises a second crankshaft supported by the second supporting shaft, and provided with a second eccentric body, wherein the second internal gear is provided at a wall surface of the second through hole, and wherein the second external gear engages with the second eccentric body, and meshes with the second internal gear.

4. The driving device according to claim 3, further comprising:
   a third eccentric body is provided on a first frame side than the first eccentric body of the first crankshaft, and the third eccentric body is symmetrically eccentric with the first eccentric body with respect to a first rotation axis of the first crankshaft,
   a third external gear engages with the third eccentric body,
   a fourth eccentric body is provided on a second frame side than the second eccentric body of the second crankshaft, and the fourth eccentric body is symmetrically eccentric with the second eccentric body with respect to a second rotation axis of the second crankshaft, and
   a fourth external gear engages with the fourth eccentric body,
   wherein, when viewed along a rotation axis direction of the rotated member, the first external gear and the second external gear are eccentric in a same direction with respect to the rotation axis of the rotated member.

5. The driving device according to claim 4, wherein the first rotation axis and the second rotation axis are coaxial, and wherein the first eccentric body and the second eccentric body are eccentric in the same direction with respect to the first rotation axis.

6. The driving device according to claim 3, wherein the first external gear is the only external gear provided to the first supporting member, wherein the second external gear is the only external gear provided to the second supporting member, and wherein, when viewed along the rotation axis direction of the rotated member, the first external gear and the second external gear are symmetrically eccentric with respect to the rotation axis of the rotated member.

7. The driving device according to claim 6, wherein the first rotation axis of the first crankshaft and the second rotation axis of the second crankshaft are coaxial, and wherein the first eccentric body and the second eccentric body are symmetrically eccentric with respect to the first rotation axis.

* * * * *